(12) United States Patent
Tsai

(10) Patent No.: US 6,793,093 B2
(45) Date of Patent: Sep. 21, 2004

(54) ANTI-STICK COOKWARE WITH COOKWARE BODY FORMED BY SPINNING

(76) Inventor: Tung-Hung Tsai, No. 22, Lane 17, Chou-Kuang St., Ta-Liao Hsiang, Kaohsiung Hsien (TW)

(*) Notice: Subject to any disclaimer, the term of this patent is extended or adjusted under 35 U.S.C. 154(b) by 0 days.

(21) Appl. No.: 10/389,570

(22) Filed: Mar. 14, 2003

(65) Prior Publication Data

US 2003/0148033 A1 Aug. 7, 2003

Related U.S. Application Data

(63) Continuation-in-part of application No. 09/998,255, filed on Nov. 30, 2001, now abandoned.

(51) Int. Cl.[7] ............................. A47J 27/00; B05D 3/00
(52) U.S. Cl. .................. 220/573.1; 427/409; 220/573.2
(58) Field of Search ........................... 220/573.1, 573.2, 220/912; 427/402, 404, 405, 407.1, 409, 447, 449, 456, 328; 72/67, 68, 80, 95, 379.2, 379.4

(56) References Cited

U.S. PATENT DOCUMENTS

| | | | | |
|---|---|---|---|---|
| 2,941,289 A | * | 6/1960 | Chace | .......................... 72/364 |
| 3,983,275 A | * | 9/1976 | Winter et al. | ............... 428/34.7 |
| 4,064,726 A | | 12/1977 | Hinze | ............................. 72/70 |
| 5,411,771 A | * | 5/1995 | Tsai | ........................... 427/456 |
| 5,455,102 A | | 10/1995 | Tsai | ........................... 428/141 |
| 5,462,769 A | | 10/1995 | Tsai | ........................... 427/307 |
| 5,545,439 A | | 8/1996 | Deng et al. | ................. 427/327 |
| 5,753,313 A | | 5/1998 | Tsai | ........................... 427/449 |
| 5,827,573 A | | 10/1998 | Tsai | ........................... 427/327 |

* cited by examiner

Primary Examiner—Shrive P. Beck
Assistant Examiner—William Phillip Fletcher, III
(74) Attorney, Agent, or Firm—Renner, Otto, Boisselle & Sklar, LLP (57) ABSTRACT

An anti-stick cookware is manufactured by a process including a step of spinning a metal plate made of an aluminum alloy to form a cookware body having a bottom portion, a side portion extending upward from the bottom portion, and an inner cooking surface defined by the bottom and side portions. The side portion of the cookware body has a thickness thinner than that of the bottom portion of the cookware body. The thickness of the bottom portion of the cookware is at least 2.5 mm, and the thickness of the side portion of the cookware is at least 1.8 mm. The thickness of the side portion is 30%–64% of that of the bottom portion.

19 Claims, 6 Drawing Sheets

ANTI-STICK COOKWARE WITH COOKWARE BODY FORMED BY SPINNING

CROSS-REFERENCE TO RELATED APPLICATION

This application is a continuation-in-part of U.S. patent application Ser. No. 09/998,255, filed on Nov. 30, 2001, and abandoned as of the filing date of this application.

BACKGROUND OF THE INVENTION

1. Field of the Invention

The invention relates to an anti-stick cookware, more particularly to an anti-stick cookware which includes a relatively thick bottom portion as compared to a side portion thereof, and which has the characteristics of being heated evenly, relatively light, anti-stick and abrasion resistant.

2. Description of the Related Art

A conventional cookware is usually made of metal material, such as stainless steel or aluminum alloy. Aluminum alloy is preferred because of the lightweight characteristics thereof. The conventional processes for manufacturing cookware include gravity die-casting process, injection die-casting process and punching and drawing process.

The gravity die-casting process includes the steps of melting metal material, such as aluminum alloy, into a liquid molten metal, pouring the liquid molten metal into a casting die having the configuration of the cookware body, solidifying the liquid molten metal, and removing the cookware body from the casting die. The injection die-casting process includes the steps of melting the metal material into a liquid molten metal, pouring the liquid molten metal into an injection casting machine, injecting the liquid molten metal into a die having the configuration of the cookware body, solidifying the liquid molten metal, and removing the cookware body from the die. However, the aforesaid two processes encounter the drawbacks such as low productivity and high cost. The punching and drawing process includes the step of punching and drawing a metal plate for forming directly into a cookware body. Therefore, the punching and drawing process has relatively higher productivity and lower cost as compared to the gravity die-casting and injection die-casting processes and thus, is commonly used in the art.

However, the cookware produced from the punching and drawing process has bottom and side portions with identical thickness. If the bottom portion of the cookware is too thin, the cookware will be heated unevenly, and the anti-stick layer (such as fluorocarbon resin) coated on the cookware will be destroyed. On the other hand, if the bottom portion of the cookware is too thick, the overall weight of the cookware and the required material for the cookware are increased. Therefore, the cookware is not convenient to use and is not economical.

U.S. Pat. No. 2,941,289 discloses a process of making a clad metal cooking utensil from a clad metal blank including a layer of copper and a relatively thin layer of stainless steel bonded to the layer of copper. In the cooking utensil made thereby, the thickness of the side wall ranges from about 65% to about 100% of the thickness of the bottom wall. This patent does not suggest that the side wall of the cooking utensil be reduced to a thickness less than 65% of the thickness of the bottom wall.

SUMMARY OF THE INVENTION

Therefore, the object of the present invention is to provide an anti-stick aluminum cookware which includes a relatively thin side portion as compared to a bottom portion thereof, and which is relatively light weight while still having sufficient strength.

Accordingly, the anti-stick cookware of this invention is manufactured by a process comprising the steps of:

spinning a metal plate, which is made of an aluminum alloy, to form a cookware body having a bottom portion, a side portion extending upward from the bottom portion, and an inner cooking surface defined by the bottom and side portions, the side portion of the cookware body having a thickness thinner than that of the bottom portion of the cookware body, wherein the thickness of the bottom portion of the cookware is at least 2.5 mm, the thickness of the side portion of the cookware is at least 1.8 mm, and the thickness of the side portion is 30%–64% of that of the bottom portion;

cleaning and roughening the inner cooking surface;

applying a metallic scratch-resistant layer onto the inner cooking surface, after being cleaned and roughened, by electric-arc spraying an abrasive metal onto the inner cooking surface; and applying an anti-stick layer of fluorocarbon resin onto the scratch-resistant layer.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENTS

Figure 1:
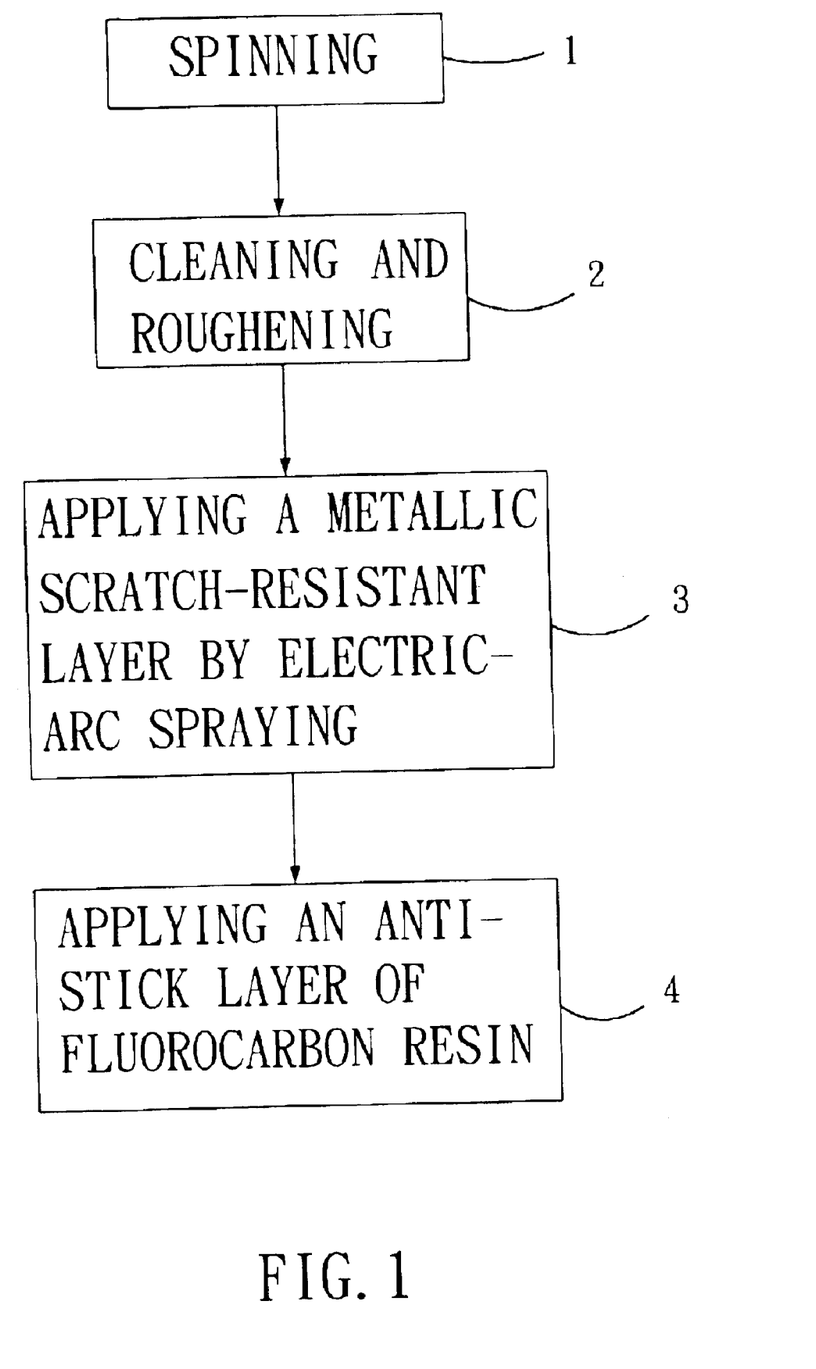
FIG. 1 is a flow diagram of the process for the manufacture of the preferred embodiment of the anti-stick cookware according to this invention.
Figure 6:
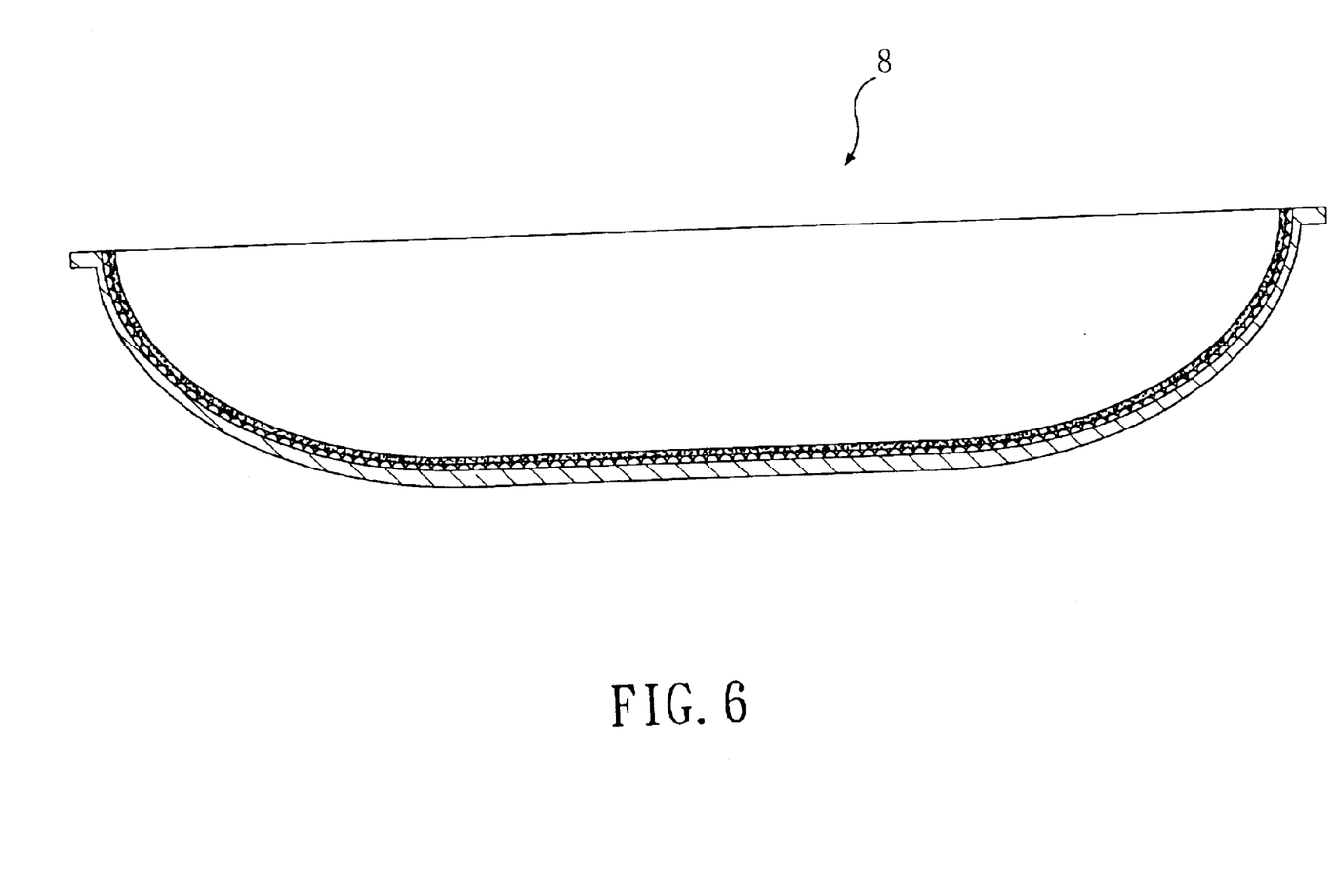
FIG. 6 is a sectional view of the preferred embodiment of the cookware according to this invention.

Referring to FIGS. 1 and 6, the preferred embodiment of the cookware 8 according to this invention is manufactured by a process including the steps of (1) spinning; (2) cleaning and roughening; (3) applying a metallic scratch-resistant layer by electric-arc spraying; and (4) applying an anti-stick layer of fluorocarbon resin.

Figure 2:
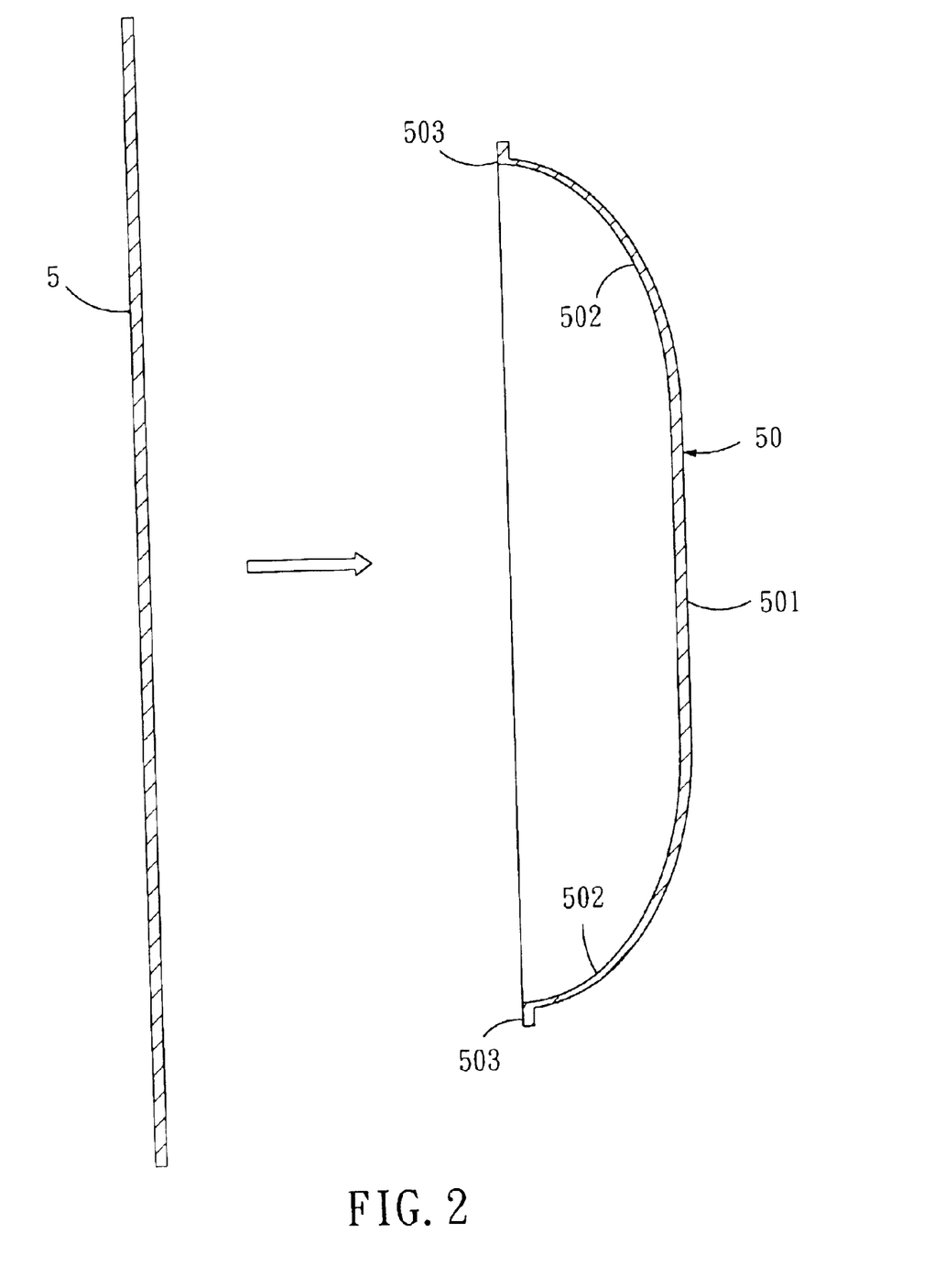
FIG. 2 is a schematic view showing the spinning step in FIG. 1.

Referring to FIG. 2, which illustrates the step (1) of FIG. 1, an aluminum plate 5 is made of an aluminum alloy containing 99.7% by weight of aluminum, based on the weight of the aluminum alloy. The thickness of the aluminum plate 5 ranges from 2.5 to 8 mm. In this embodiment, the thickness of the aluminum plate 5 is 3.3 mm. The aluminum plate 5 is then spun to form a cookware body 50, which has a bottom portion 501, a side portion 502 extending upward from the bottom portion 501, and an inner cooking surface defined by the bottom and side portions 501, 502. The side portion 502 of the cookware body 50 has a thickness thinner than that of the bottom portion 501 of the cookware body 50. The thickness of the side portion 502 is 30%–64% of that of the bottom portion 501. Preferably, the cookware body 50 further includes a flange portion 503 extending outward from a peripheral edge of the side portion 502. The flange portion 503 has a thickness substantially equal to that of the bottom portion 501. In this embodiment, the bottom and flange portions 501, 503 of the cookware body 50 are maintained at a thickness of 3.3 mm, and the thickness of the side portion 502 of the cookware body 50 is reduced from the bottom portion 501 of the cookware body 50 toward the flange portion 503 of the cookware body 50.

Some examples of the cookware manufactured according to this invention are listed in Table 1 in terms of the diameter of the cookware, the thickness of the bottom portion of the cookware, the thickness of the side portion of the cookware, and the ratio of the thickness of the side portion to the thickness of the bottom portion.

TABLE 1

| TYPE | Diameter (cm) | Thickness of the bottom portion (Thickness of the aluminum alloy plate) | Thickness of the side portion (minimum) | Ratio of the side portion to the bottom portion | Comment |
|---|---|---|---|---|---|
| Pot | Generally, 20, 22, and 24 | 3 mm<br>4 mm<br>5 mm<br>6 mm | 1.8 mm<br>1.8 mm<br>1.8 mm<br>1.8 mm | 60%<br>45%<br>36%<br>30% | The thickness of the side portion is not less than 1.8 mm. Otherwise, the strength of the cookware is not sufficient. |
| Wok | Generally, 26, 28, 30, and 36 | 3 mm<br>4 mm<br>5 mm<br>6 mm | 1.8 mm<br>1.8 mm<br>1.8 mm<br>1.8 mm | 60%<br>45%<br>36%<br>30% | The thickness of the side portion is not less than 1.8 mm. Otherwise, the strength of the cookware is not sufficient. |
| Pan | | 3 mm<br>4 mm | 1.8 mm<br>1.8 mm | 60%<br>45% | The thickness of the side portion is not less than 1.8 mm. Otherwise, the strength of the cookware is not sufficient. |

Figure 3:
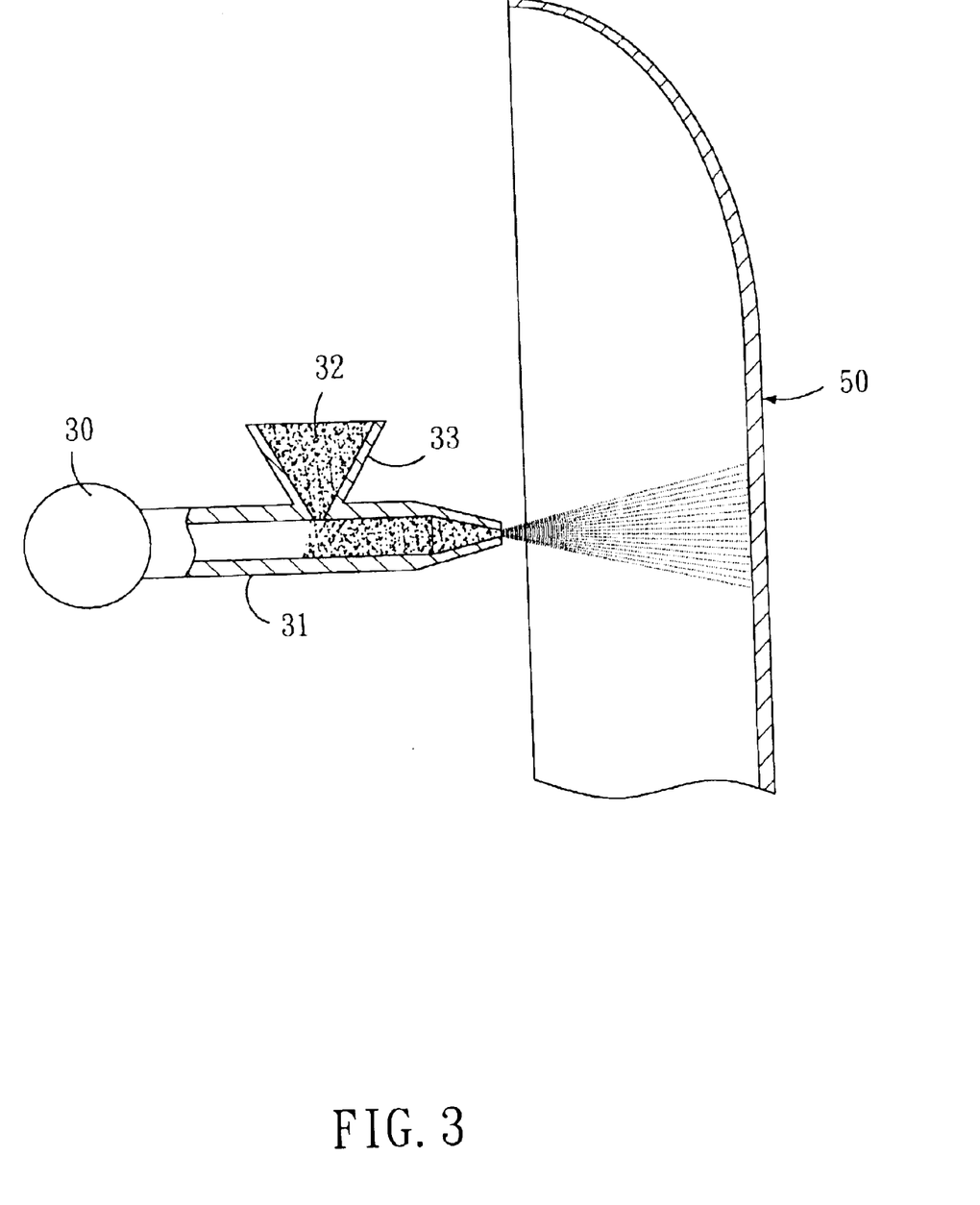
FIG. 3 is a schematic view showing the cleaning and roughening step in FIG. 1.

Referring to FIG. 3, which illustrates the step (2) of FIG. 1, fine aluminum oxide particles 32 are contained in a funnel 33 which is connected to a nozzle 31. The nozzle 31 is connected to a device 30 containing compressed gas therein. The aluminum oxide particles 32 are propelled through the nozzle 31 by the compressed gas onto the cooking surface of the cookware body 50 in order to clean and roughen the cooking surface of the cookware body 50. The cleaned and roughened cooking surface has an average roughness of Ra 4.5–5.5 μm. The cooking surface is cleaned and roughened so as to facilitate the attachment and bonding of a further coating layer thereon.

Figure 4:
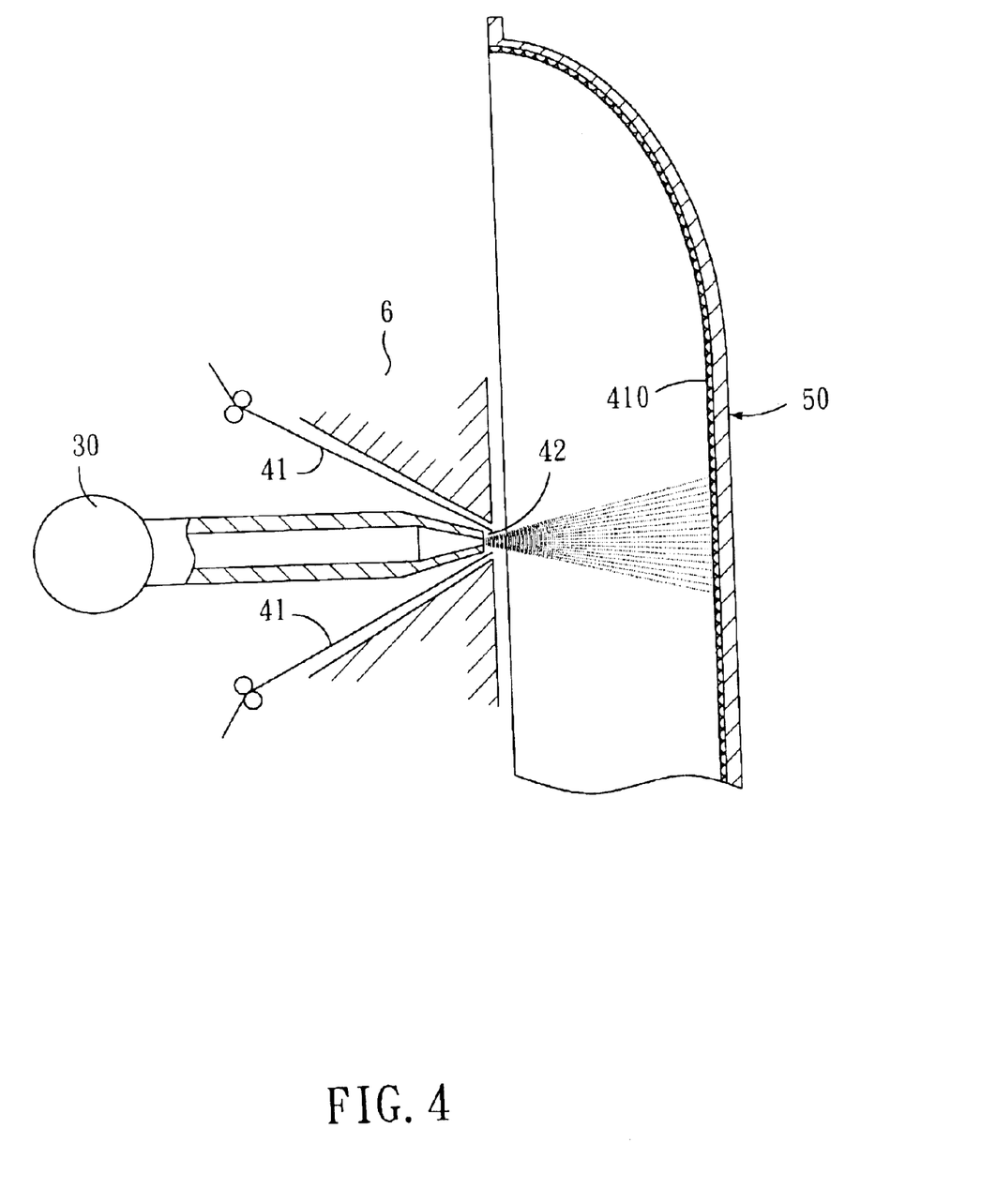
FIG. 4 is a schematic view showing the step of applying a metallic scratch-resistant layer by electric-arc spraying in FIG. 1.

Referring to FIG. 4, which illustrates the step (3) of FIG. 1, a scratch-resistant layer 410 is applied onto the cleaned and roughened cooking surface by electric-arc spraying. Two metal wires 41, 41' are respectively fed into the electric-arc device 6 toward an opening 42. One of the metal wires 41 is made of a stainless steel which consists of less than 0.2% by weight of carbon, 17–20% by weight of chromium, 7–10% by weight of nickel and the remainder being iron. The other metal wire 41' is made of an aluminum alloy which consists of 0.25% by weight of silicon, 0.40% by weight of iron, 0.10% by weight of copper, 0.05–0.20% by weight of manganese, 4.5–5.5% by weight of magnesium, 0.05–0.20% by weight of chromium, 0.10% by weight of zinc, 0.06–0.20% by weight of titanium, 0.15% by weight of impurities and the remainder being aluminum. The metal wires 41, 41' are melted by means of the electric-arc device 6, which supplies electric power having a DC voltage of 30V–40V and a current of 100A–300A, and the resulting melt is propelled by the compressed gas in the device 30 for spraying onto the cleaned and roughened cooking surface, thus forming the scratch-resistant layer 410 on the cleaned and roughened cooking surface of the cookware body 50. The scratch-resistant layer 410 formed on the cooking surface of the cookware body 50 contains essentially iron, chromium, aluminum, nickel and titanium, which provides corrosion resistant characteristics for the cookware body 50.

Figure 5:
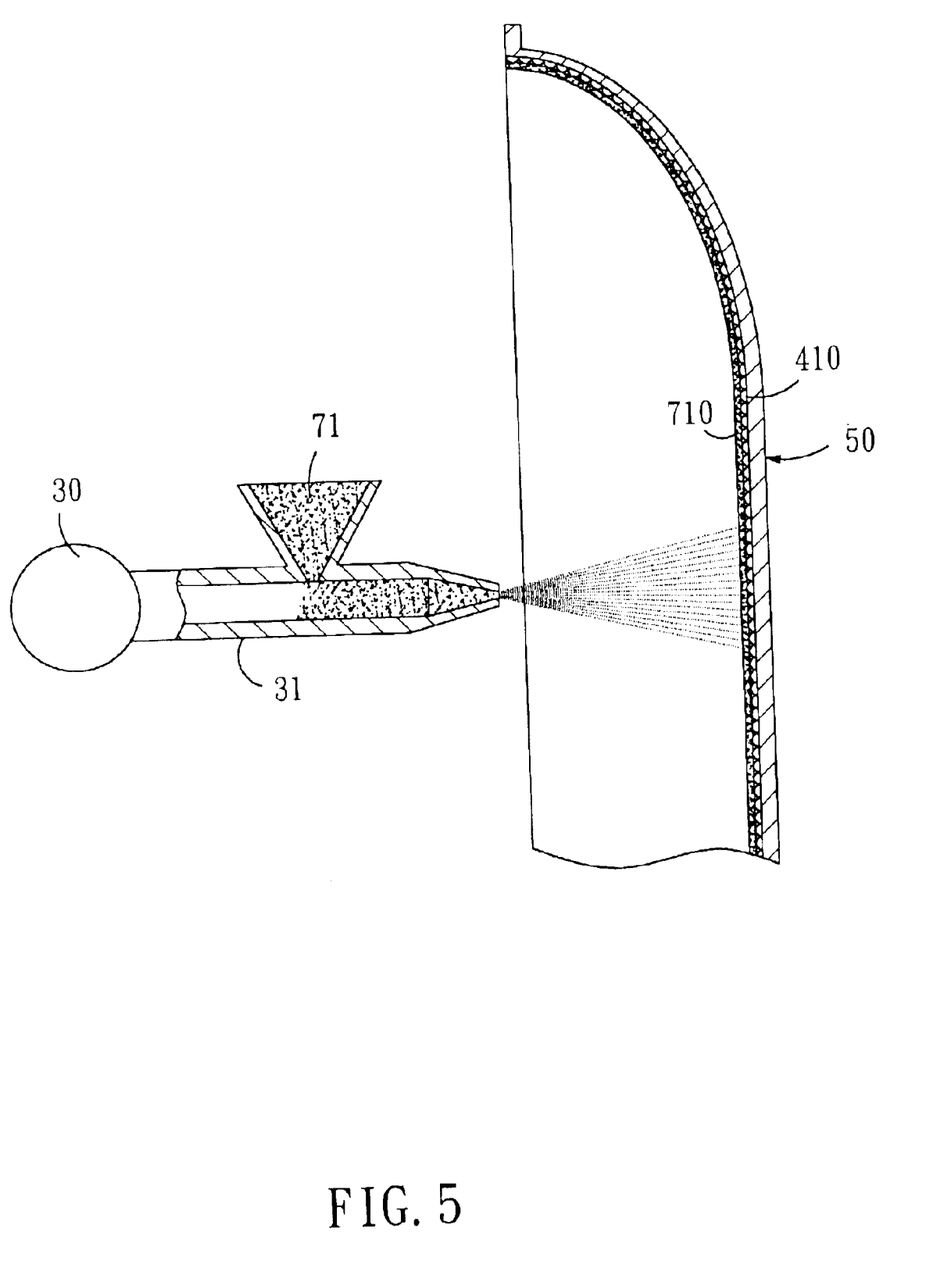
FIG. 5 is a schematic view showing the step of applying an anti-stick layer of fluorocarbon resin in FIG. 1.

Referring to FIG. 5, which illustrates the step (4) of FIG. 1, an anti-stick layer 710 containing fluorocarbon resin is applied over the scratch-resistant layer 410 through a known spray coating technique. The fluorocarbon resin composition 71 is propelled by the compressed gas in the device 30 through the nozzle 31 for spraying onto the scratch-resistant layer 410 previously formed on the cooking surface of the cookware body 50. At this point, the cooking surface is heated to a temperature of 90–100° C. for 5–10 minutes to dry the fluorocarbon resin composition 71 sprayed thereon so as to form the anti-stick layer 710. The fluorocarbon resin composition 71 contains about 40–50% by weight of fluorocarbon resin and the remainder being solvent, based on the weight of the fluorocarbon resin composition 71. The fluorocarbon resin contains about 55% by weight of polytetrafluoroethylene (PTFE), about 45% by weight of perfluoroalkoxy polymers (PFA), and the remainder being pigment and surfactant, based on the total weight of the fluorocarbon resin.

Additional technical details of the aforementioned steps (2), (3) and (4) can be found in U.S. Pat. No. 5,753,313, the entire disclosure of which is incorporated herein by reference.

The results of a test for comparing the cookware 8 of this invention with those manufactured by the other conventional processes are shown in the following Table 2.

TABLE 2

|  | Gravity die-casting | Injection die-casting | Punching and drawing | Spinning |
| --- | --- | --- | --- | --- |
| Productivity per 8 hrs using a single die | 300 pcs | 600 pcs | 1500 pcs | 2000 pcs |
| Additional processing | Yes | Yes | Yes | No |
| The weight of the raw metal plate | 100% | 80% | 75% | 60% |
| Sectional configuration of cookware | The bottom portion is thicker than the side portion | The bottom portion is thicker than the side portion | The bottom portion is substantially as thick as the side portion | The bottom portion is thicker than the side portion |
| Failure | 15% | 20% | 3–5% | Less than 1% |
| Durability of cookware | 100% | 90% | 50% | 100% |
| Cost of the die | 30% | 100% | 50% | 20% |

Some of the advantages of the cookware of this invention over the prior art are described as follows:

1. The cookware 8 of this invention, which is formed by the spinning process, can be heated evenly owing to the configuration of the cookware body 50, which has the bottom portion 501 thicker than the side portion 502.

2. As compared to the cookware body produced by the punching and drawing process, the overall weight of the cookware body 50 of this invention is relatively light in view of the thinner side portion 502 of the cookware body 50. The cost of producing the cookware body 50 of this invention is also reduced.

3. Since the cookware body 50 is applied with an anti-stick layer 710 containing fluorocarbon resin 71, the cookware 8 of this invention is provided with anti-stick and high hardness characteristics.

4. Since the cookware body 50 is applied with a scratch-resistant layer 410, the cookware 8 of this invention is further provided with rustproof and scratch-resistant characteristics.

5. As shown in Table 2, the production yield of the cookware body 50 of this invention is 2000 pieces per 8 hours, which is much higher than those of the prior art. Furthermore, since the cookware body 50 with an accurate size can not be produced by the prior art, an additional edge is required in the raw cookware body of the prior art, which should be removed during an additional processing step. In contrast, it is not necessary to form such an additional edge in the cookware body 50 of this invention. Therefore, the additional processing step required in the prior art can be eliminated.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. An anti-stick cookware manufactured by a process which comprises steps of:

spinning a metal plate, which is made of an aluminum alloy, to form a cookware body having a bottom portion, a side portion extending upward from said bottom portion, and an inner cooking surface defined by said bottom and side portions, said side portion of said cookware body having a thickness thinner than that of said bottom portion of said cookware body, wherein the thickness of said bottom portion of said cookware is at least 2.5 mm, the thickness of said side portion of said cookware is at least 1.8 mm, and the thickness of said side portion being 30%–64% of that of said bottom portion;

cleaning and roughening said inner cooking surface;

applying a metallic scratch-resistant layer onto said inner cooking surface, after being cleaned and roughened, by electric-arc spraying an abrasive metal onto said inner cooking surface; and applying an anti-stick layer of fluorocarbon resin onto said scratch-resistant layer.

2. The anti-stick cookware as claimed in claim 1, wherein said cookware body further includes a flange portion extending outward form a peripheral edge of said side portion, said flange portion having a thickness substantially equal to that of said bottom portion.

3. The anti-stick cookware as claimed in claim 1, wherein said aluminum alloy contains 99.7% by weight of aluminum, based on the weight of said aluminum alloy.

4. The anti-stick cookware as claimed in claim 1, wherein said metal plate has a thickness ranging from 2.5 to 8 mm.

5. The anti-stick cookware as claimed in claim 1, wherein said cleaning and roughening step is conducted by spraying aluminum oxide particles against said inner cooking surface at high pressure.

6. The anti-stick cookware as claimed in claim 1, wherein said abrasive metal is selected from the group consisting of stainless steel and aluminum oxide.

7. An article of cookware comprising:

a cookware body spun from an aluminum alloy metal plate, the cookware body having a bottom portion, a side portion extending upward from the bottom portion, and an inner cooking surface defined by a surface of the aluminum alloy metal plate; and one or more layers applied to the inner cooking surface;

wherein the side portion of the cookware body has a thickness 30%–64% thinner than that of the bottom portion of the cookware body.

8. An article of cookware as set forth in claim 7, wherein the thickness of the bottom portion of the cookware body is at least 2.5 mm.

9. An article of cookware as set forth in claim 7, wherein the thickness of the side portion of the cookware is at least 1.8 mm.

10. An article of cookware as set forth in claim 9, wherein the thickness of the bottom portion of the cookware body is at least 2.5 mm.

11. An article of cookware as set forth in claim 7, wherein the one or more layers applied to the inner cooking surface comprise a metallic scratch-resistant layer.

12. An article of cookware as set forth in claim 11, wherein the one or more layers applied to the inner cooking surface comprise an anti-stick layer.

13. A method of manufacturing an article of cookware, said method comprising the steps of:

providing a flat metal plate;

spinning the flat metal plate to form a cookware body having a bottom portion, a side portion extending upward from the bottom portion, and an inner cooking surface defined by the bottom and side portions, the side portion of the cookware body having a thickness 30% to 64% thinner than that of the bottom portion of the cookware body; and applying layers to the inner cooking surface, after said spinning step.

14. A method as set forth in claim 13, wherein the spinning step results in the thickness of the bottom portion of the cookware being at least 2.5 mm and the thickness of the side portion of the cookware being at least 1.8 mm.

15. A method as set forth in claim 13, further comprising the step of cleaning and roughening the inner cooking surface, after the spinning step and before the layer-applying step.

16. A method as set forth in claim 13, wherein said layer-applying step comprises applying a metallic scratch-resistant layer.

17. A method as set forth in claim 16, wherein said step of applying the metallic scratch-resistant layer is preformed by electric-arc spraying an abrasive metal onto the inner cooking surface.

18. A method as set forth in claim 16, wherein said layer-applying step also comprises applying an anti-stick layer onto the scratch-resistant layer.

19. A method as set forth in claim 13, wherein said layer-applying step comprises applying an anti-stick layer.

* * * * *